United States Patent
Stephens (10) Patent No.: US 6,538,783 B1
(45) Date of Patent: Mar. 25, 2003

(54) OPTICAL SYSTEMS INCLUDING ADD DROP DEVICES AND METHODS

(75) Inventor: Thomas D. Stephens, Columbia, MD (US)

(73) Assignee: Corvis Corporation, Columbia, MD (US)

(*) Notice: Subject to any disclaimer, the term of this patent is extended or adjusted under 35 U.S.C. 154(b) by 0 days.

(21) Appl. No.: 09/398,541

(22) Filed: Sep. 17, 1999

Related U.S. Application Data (60) Provisional application No. 60/101,031, filed on Sep. 18, 1998.

(51) Int. Cl.[7] ............................................. H04J 14/02
(52) U.S. Cl. ........................ 359/127; 359/130; 385/17; 385/37
(58) Field of Search ...................... 359/127, 124, 359/115, 130; 385/17, 37, 45

(56) References Cited

U.S. PATENT DOCUMENTS

| | | | |
|---|---|---|---|
| 5,283,686 A | | 2/1994 | Huber |
| 5,446,809 A | * | 8/1995 | Fritz et al. ..................... 385/17 |
| 5,457,758 A | | 10/1995 | Snitzer |
| 5,555,118 A | | 9/1996 | Huber |
| 5,570,440 A | * | 10/1996 | Mizrahi ....................... 385/37 |
| 5,579,143 A | | 11/1996 | Huber |
| 5,600,473 A | | 2/1997 | Huber |
| 5,712,932 A | | 1/1998 | Alexander et al. |
| 5,726,785 A | | 3/1998 | Chawki et al. |
| 5,778,118 A | | 7/1998 | Sridhar |
| 5,946,430 A | | 8/1999 | Morrow et al. |
| 6,281,997 B1 | * | 8/2001 | Alexander et al. .......... 359/130 |

FOREIGN PATENT DOCUMENTS

WO    WO 97/06614    *   2/1997    ............. H04J/3/08

OTHER PUBLICATIONS

An Optical FDM–Add/Drop Multiplexing Ring Network Utilizing Fiber Fabry–Perot Filters and Optical Circulators by Kazuhiro Oda and Hiromu Toba, pp. 825–828, IEEE Photonics Technology Letters, vol. 5, No. 7, Jul. 1993.

Wavelength reuse scheme in a WDM unidirectional ring network using a proper fibre grating add/drop multiplexer by Chawki, M. J., et al., pp. 476–477, Electronics Letters, Mar. 16th, 1995, vol. 31, No. 6.

* cited by examiner

*Primary Examiner*—John Tweel (57) ABSTRACT

Optical systems of the present invention include an add/drop device and/or cross-connect device, which is reconfigurable to add and drop signal wavelengths between one or more transmission paths. The add/drop device includes a first selective element configurable to pass a first group of signal wavelengths including at least a first signal wavelength from an input path to a first add/drop path and pass continuing signal wavelengths differing from the first group of signal wavelength to a second add/drop path. A second selective element is provided that is configurable to pass a second group of signal wavelengths including at least a second signal wavelength from said first add/drop path and continuing signal wavelengths differing from the second group of wavelengths from said second add/drop path to an output path. The second selective element is further configured to pass the second group of signal wavelengths from said second add/drop path and wavelengths differing from the second wavelength from said first add/drop path to a drop path. The add/drop device may also include an add path to introduce add signal wavelengths directly to the output path or via at least one of the first and second selective elements.

20 Claims, 8 Drawing Sheets

OPTICAL SYSTEMS INCLUDING ADD DROP DEVICES AND METHODS

CROSS-REFERENCE TO RELATED APPLICATIONS

This application claims the benefit of U.S. Provisional Patent Application Ser. No. 60/101,031 filed Sep. 18, 1998, which is incorporated herein by reference.

STATEMENT REGARDING FEDERALLY SPONSORED RESEARCH OR DEVELOPMENT

Not Applicable

BACKGROUND OF THE INVENTION

The present invention is directed generally to optical transmission systems. More particularly, the invention relates to adding and/or dropping one or more optical signal wavelengths from a wavelength division multiplexed (WDM) signal in an optical communications system.

The emergence of the Internet as a means for transporting and accessing data combined with continual growth in traditional communications has greatly accelerated the need for high capacity transmission systems. Telecommunications service providers, in particular, have looked to wavelength division multiplexing (WDM) to further increase the capacity of their existing systems.

In optical transmission systems, information is typically transmitted between central processing centers, or points of presence, which are used to collect information being electronically transmitted from a number of smaller distributed locations. In these systems, it is often desirable and cost effective to distribute or collect information along the optical path between the centers without the cost of providing another central processing center. Optical add/drop ("OAD") devices can be used at locations in the optical system where the amount of information being transmitted and received at the location does not make it economically feasible to process all of the information being transmitted in the system.

Optical add/drop, or insert/remove, devices are generally configured to drop/remove one or more predetermined wavelengths ("drop wavelengths") from a WDM signal entering the device and add/insert the same, or possibly different, wavelengths to the signal. For example, see U.S. Pat. Nos. 5,283,686, 5,555,118, 5,579,143, 5,600,473, 5,726,785, 5,778,118.

Many OAD devices include one or more filtering elements, i.e., Bragg gratings, Fabry-Perot filters, etc., which are used to either drop signal wavelengths for further processing or merely filter and remove the signal wavelengths from the transmission line. OAD devices that include filtering elements, or filters, allow for the reuse of the filter wavelengths to add wavelengths to the system.

In some OAD devices, the filtering elements can be turned to vary the wavelength that is being filtered. For example, the properties of a Bragg grating element can be varied to change the central reflective wavelength of the Bragg grating. In lightly populated WDM systems, sufficient bandwidth exists between signal wavelengths that the elements can be tuned to a wavelength not carrying a signal. Thus, a tunable OAD device can be provided in which the dropped or filtered wavelengths can be variably tuned according to the requirements of the system.

However, in dense wavelength division multiplexing ("DWDM") systems, there is not sufficient bandwidth between the signal wavelengths to tune the filtering element in the OAD device to pass a wavelength without interfering with an adjacent wavelength. Therefore, many traditional OAD devices can not operate a tunable devices in DWDM systems.

This limitation of traditional OAD devices affects the flexibility of DWDM systems, particularly when planning for system upgrades or reconfigurations. For example, traditional OAD devices will have to be replaced when new or different wavelengths are to be dropped and/or added depending upon the configuration of the traditional OAD device.

One proposed solution is to place the filtering elements in one leg of an optical line switch and provide a bypass line in another leg of the switch. While bypass line switching provides the desired functionality, the use of line switches can introduce an unacceptable amount of loss into the OAD device. As such, the switched filter OAD devices can not be widely deployed in optical systems. Thus, there remains a clear need for OAD devices that provide increased flexibility and inexpensive upgrade paths for DWDM systems.

BRIEF SUMMARY OF THE INVENTION

The present invention addresses the need for increasingly flexible optical transmission systems, apparatuses, and methods including add/drop and cross-connect devices for WDM systems. Optical systems of the present invention include an add/drop device and/or cross-connect device, which can reconfigurably add and drop signal wavelengths between one or more transmission paths.

The add/drop device includes a first selective element configurable to pass a first group of signal wavelengths including at least a first signal wavelength from an input path to a first add/drop path and pass continuing signal wavelengths differing from the first group of signal wavelengths to a second add/drop path. A second selective element is provided that is configurable to pass a second group of signal wavelengths including at least a second signal wavelength from the first add/drop path and continuing signal wavelengths differing from the second group of wavelengths from the second add/drop path to an output path. The second selective element also passes the second group of signal wavelengths from the second add/drop path and wavelengths differing from the second group of signal wavelengths from the first add/drop path to a drop path.

The add/drop device may also include an add path to introduce add signal wavelengths directly to the output path or via at least one of the first and second selective elements. In addition, a broadcast drop path from the input path can be provided to access all signal wavelengths entering the OAD device via the input path.

In various embodiments, the add/drop device includes first and second optical circulators. The first optical circulator includes an input port optically connected to a first add/drop port, a second add/drop port optically connected by a first add/drop path to the first add/drop port, and to an output port. The second optical circulator includes a first add/drop port optically connected by a second add/drop path to a second add/drop port, which can be optically connected to a drop port. The first selective element is optically connected between the first add/drop ports on the first and second circulators and the second selective element is optically connected between the second add/drop ports on the first and second circulators.

The reconfigurable add/drop devices of the present invention provide flexibility in adding, dropping, and crossconnecting signal wavelengths in WDM systems. The flexibility is provided without requiring that new components being installed in the system or that the system be taken offline to perform the reconfiguration.

Accordingly, the present invention addresses the aforementioned concerns by providing optical systems apparatuses, and methods having increased flexibility. These advantages and others will become apparent from the following detailed description.

BRIEF DESCRIPTION OF THE DRAWINGS

Embodiments of the present invention will now be described, by way of example only, with reference to the accompanying drawings for the purpose of illustrating embodiments only and not for purposes of limiting the same; wherein like members bear like reference numerals and.

DESCRIPTION OF THE INVENTION

Optical systems 10 of the present invention include an optical add and/or drop ("add/drop") device 12 optically connecting one or more optical transmitters 14 to one or more optical receivers 16 via an optical transmission medium 18, which is usually an optical fiber.

Figure 1A:
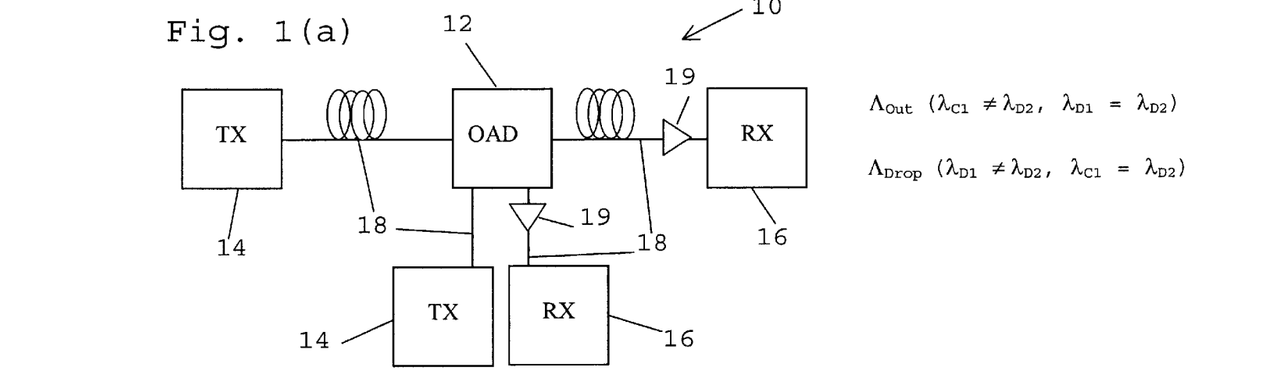
FIGS. 1a&b show optical system embodiments.
Figure 1B:
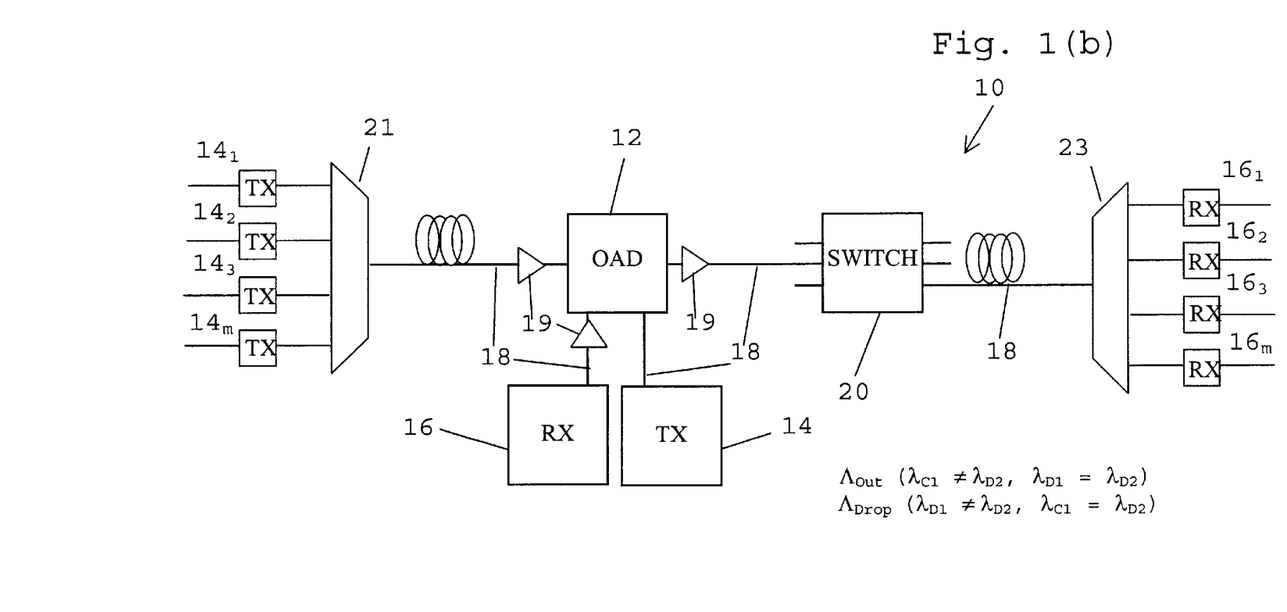

The optical system 10 can be controlled by a network management system and configured in multi-dimensional networks (FIG. 1a) or in one or more interconnected point to point links (FIG. 1b). The system 10 can be configured to provide uni-directional or bi-directional transmission in each fiber 18. Optical amplifiers 19 can also be disposed along the optical fiber 18 to overcome attenuation caused by the fiber 18 or the OAD and other devices installed along the fiber.

The optical transmitters 14 are generally configured to receive information via electrical signals and transmit the information via optical signals using one or more optical wavelengths. The optical receivers 16 are generally configured to receive the optical signals from the transmitter 14 and convert the information carried by the one or more optical wavelengths into corresponding electrical signals.

In FIG. 1(b) embodiments, the system 10 can be configured as a network in which one or more optical cross-connect switches or routers 20 can also be used to interconnect diversely located transmitters 14 or receivers 16. In various embodiments, one or more of the transmitters 14 and receivers 16 can be wavelength tunable to provide wavelength allocation flexibility in the optical system 10.

One skilled in the art will appreciate that the transmitters 14 and receivers 16 can be externally connected to an electrical transmission system or be used within a larger optical system for signal regeneration, such as with back to back terminals that are either connected directly or via interfacial devices. The interfacial devices, such as electrical and optical cross-connect switches, IP routers, etc., provide interface flexibility within, and at the periphery of, the optical system 10. The interfacial devices can be configured to receive, convert, and provide information in one or more various protocols, encoding schemes, and bit rates to the transmitters 14, and perform the converse function for the receivers 16. The interfacial devices also can be used to provide protection switching in various nodes 16 depending upon the configuration.

In WDM systems, a plurality of information carrying optical signal wavelengths $\lambda_i$ provided by one or more transmitters 14 are combined into a WDM optical signal $\Lambda_i$ using an optical combiner 21 and sent through the fiber 18. An optical distributor 23 is used to provide one or more of the signal wavelengths in the WDM signal to the receivers 16. The optical combiners 21 and distributors 23 can include wavelength selective and non-selective ("passive") fiber and free space devices, as well as polarization sensitive devices. Passive or WDM couplers/splinters, circulators, dichroic devices, prisms, gratings, etc. can be used alone, or in combination with various tunable or fixed, high, low, or band pass or stop, transmissive or reflective filters, such as Bragg gratings, Fabry-Perot devices, dichroic filters, etc. in various configurations of the optical combiners 21 and distributors 23. Furthermore, the combiners 21 and distributors 23 can include one or more serial or parallel stages incorporating various devices to multiplex, demultiplex, and broadcast signal wavelengths $\lambda_i$ in the optical systems 10.

FIGS. 2–9 show exemplary embodiments of the add/drop devices of the present invention. Generally, an optical signal $\Lambda_{IN}$ including wavelengths $\lambda_{1-N}$ from the transmission fiber 18 enters the OAD device 12 via an input path 22. The optical signal $\Lambda_{IN}$ will generally be a WDM signal, but it is not necessary in the present invention. The input path 22 passes the optical signal $\Lambda_{IN}$ to a first set of selective elements $24_1$, which are configurable to pass, or direct, a first group of signal wavelengths including one or more first signal wavelengths that are to be dropped, i.e., "$1^{st}$ drop wavelengths" $\lambda_{D1}$ to a first add/drop path $26_1$ and pass any continuing wavelengths differing from the $1^{st}$ drop wavelengths $\lambda_{C1}$ to a second add/drop path $26_2$.

A second set of selective elements $24_2$ are optically connected between the first and second add/drop paths, $26_1$ and $26_2$. The second selective elements $24_2$ are configurable to pass, or direct, a second group of signal wavelengths including one or more second signal wavelengths that are to be dropped, i.e., "$2^{nd}$ drop wavelengths" $\lambda_{D2}$ from the second add/drop path $26_2$ and wavelengths differing from the second drop wavelengths $\lambda_{D2}$ from the first add/drop path to a drop path 28. In addition, the second selective elements $24_2$ are configurable to direct the second wavelengths $\lambda_{D2}$ from the first add/drop path and continuing wavelengths differing from the second wavelength from the second add/drop path to an output path 30. The drop path 28 and the output path 30 are collectively referred to as exit paths. In a number of embodiments, the exit paths may be interchangeable in location depending on whether the selective elements 26 pass the drop wavelength via reflection or transmission, as will be further discussed.

The selective elements $24_i$ used in the present invention can include one or more Bragg gratings, each of which can reflect one or more signal wavelengths. The selective elements $24_i$ can also be other transmissive/reflective wavelength selective elements, such as Fabry-Perot and dichroic filters and other transmissive/reflective filters.

In configurations with two sets of selective elements, $24_1$ and $24_2$, the wavelengths that will be dropped from the device 12 will be those wavelengths that are not common to both selective elements ($\lambda_{D1} \neq \lambda_{D2}$). Likewise, the wavelengths that are common to the two selective elements, $24_1$ and $24_2$, will not be dropped, but passed, or directed, through the device 12 to the output path 30. One skilled in the art will appreciate that additional add/drop paths $26_i$ and selective elements $24_i$ can be cascaded to select various wavelengths from the input signal $\Lambda_{IN}$.

The present invention can be used with selective elements $24_i$ that are configurable to reflect or transmit two or more consecutive, i.e., contiguous or side by side, signal wavelengths. The reflective/transmissive bandwidth of the elements $24_i$ used to select two or more wavelengths are larger than the bandwidth between the signal wavelengths, thus traditional tuning of the elements can not be performed. However, the present invention provides for preventing the dropping of multiple signal wavelengths by tuning the selective elements $24_1$ and $24_2$, to the same wavelength.

Figure 2A:
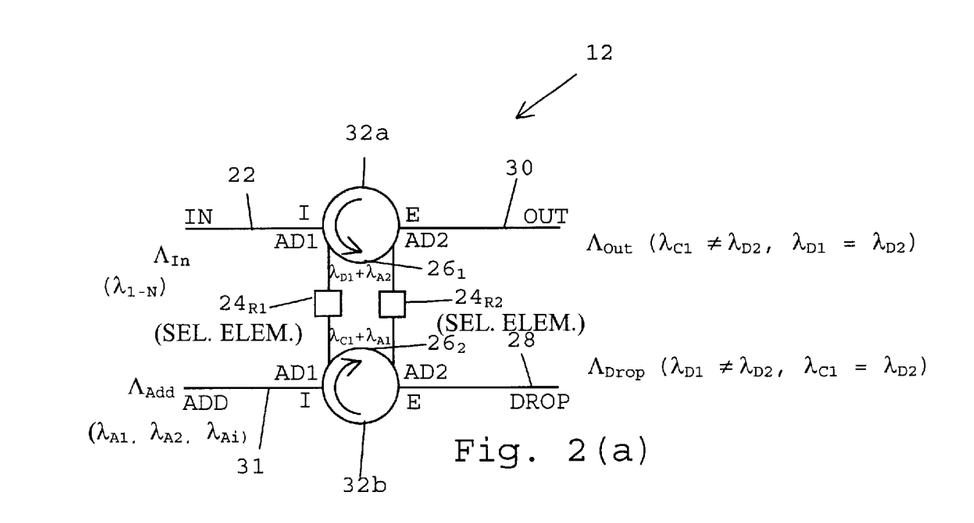
FIGS. 2–9 show various add and/or drop device embodiments.
Figure 2B:
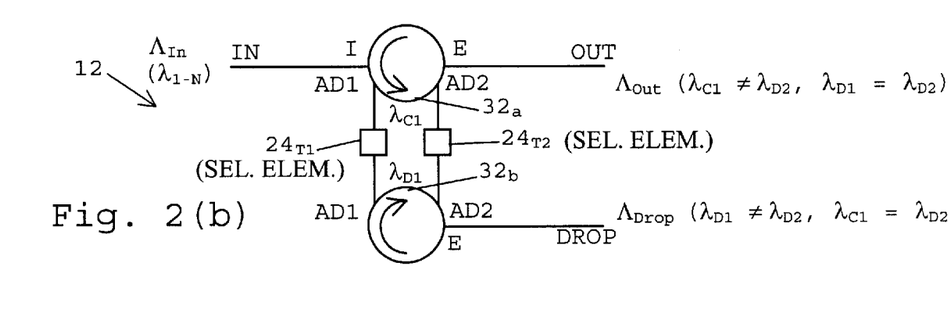

FIGS. 2(a&b) show two embodiments in which first and second optical circulators, 32a and 32b, respectively, are used to perform the add/drop functions and provide equal loss through all paths in the device 12. As shown in FIG. 2(a), the optical signal $\Lambda_{IN}$ enters the OAD device 12 through the input path 22 and into port I of the first circulator 32a. The signal $\Lambda_{IN}$ exits the first circulator 32a from a first add/drop port AD1, where it encounters the first selective element $24_1$. If the first selective element is a reflective element, designated $24_{R1}$, the first drop wavelengths $\lambda_{D1}$ will be reflected back through the first add/drop port AD1 into first circulator 32a, travel along the first add/drop path $26_1$, exit the first circulator 32a through a second add/drop port AD2, and encounter the second selective element $24_2$.

Likewise, the continuing wavelengths differing from the first drop wavelengths $\lambda_{C1}$ will pass through the first selective element $24_{R1}$, enter second circulator 32b through the first add/drop port AD1 and pass along the second add/drop path $26_2$. The continuing wavelengths $\lambda_{C1}$ will exit the second circulator 32b via a second add/port port AD2 and encounter the second selective element $24_2$.

If the second selective element $24_2$ is a reflective element, designated $24_{R2}$, the second drop wavelengths $\lambda_{D2}$ will be reflected from the continuing wavelengths $\lambda_{C1}$ to the drop path 28 and exit the device 12 through the second add/drop port AD2 and exit port E of the second circulator 32b. In addition, any wavelength from the first drop wavelength $\lambda_{D1}$ differing from the second drop wavelengths $\lambda_{D2}$ will pass through the second selective element $24_{R2}$ and also exit the device 12 through the drop path 28 via the same path.

Analogously, those continuing wavelengths $\lambda_{C1}$ that differ from the second drop wavelengths $\lambda_{D2}$ will pass through the second selective element $24_2$ to the output path 30 exiting the device 12 through the second add/drop port AD2 and exit port E of the first circulator 32a. Also, the second drop wavelengths $\lambda_{D2}$ will be reflected from the first drop wavelength $\lambda_{D1}$ and exit the device 12 through the output path 30.

The second selective element $24_2$ can be used to drop additional wavelengths not dropped using the first selective element $24_1$ or prevent the dropping of one or more of the first drop wavelengths $\lambda_{D1}$. Similarly, the selective elements $24_i$ can be transmissive elements and the paths followed by the various wavelengths will be reversed, as shown in FIG. 2(b).

As shown in FIG. 2(a), an add path 31 can also be optically connected to the second circulator 32b through an input port I to add an optical signal $\Lambda_{Add}$. In this configuration, add wavelengths $\lambda_{A1}$ and $\lambda_{A2}$ in the optical signal $\Lambda_{Add}$ corresponding to the first and second drop wavelengths $\lambda_{D1}$ and $\lambda_{D2}$ can be inserted into the optical signal $\Lambda_{out}$ exiting through the output path 30. In addition, wavelengths in the optical signal $\Lambda_{Add}$ not corresponding to the first and second drop wavelengths $\lambda_{D1}$ and $\lambda_{D2}$ will exit the device through drop path 28 in optical signal $\Lambda_{Drop}$. One skilled in the art will appreciate that the add path 32 can be included in the device 12 at many different locations, such proximate the output path 30.

Figure 3A:
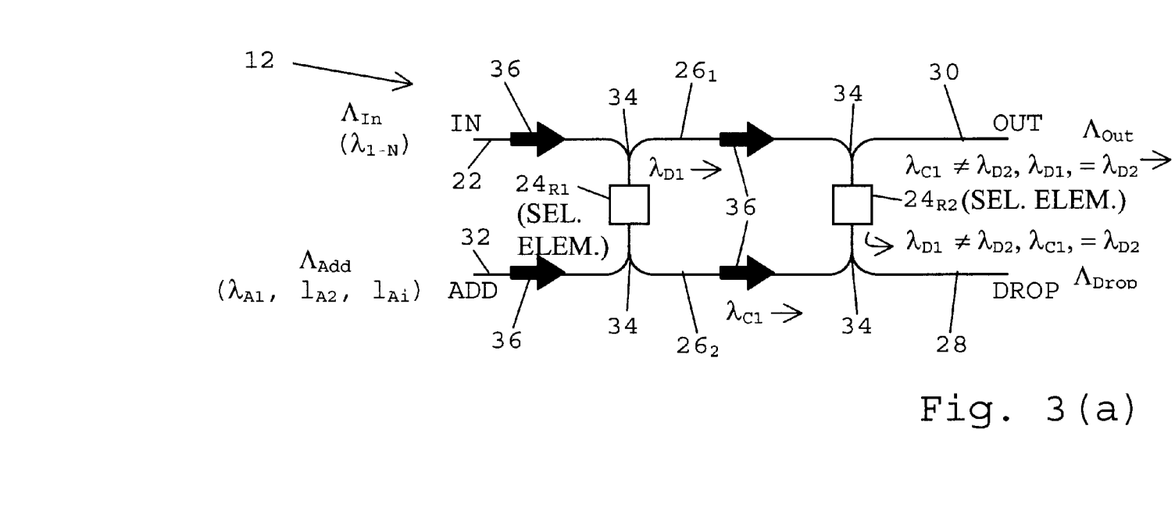
Figure 3B:
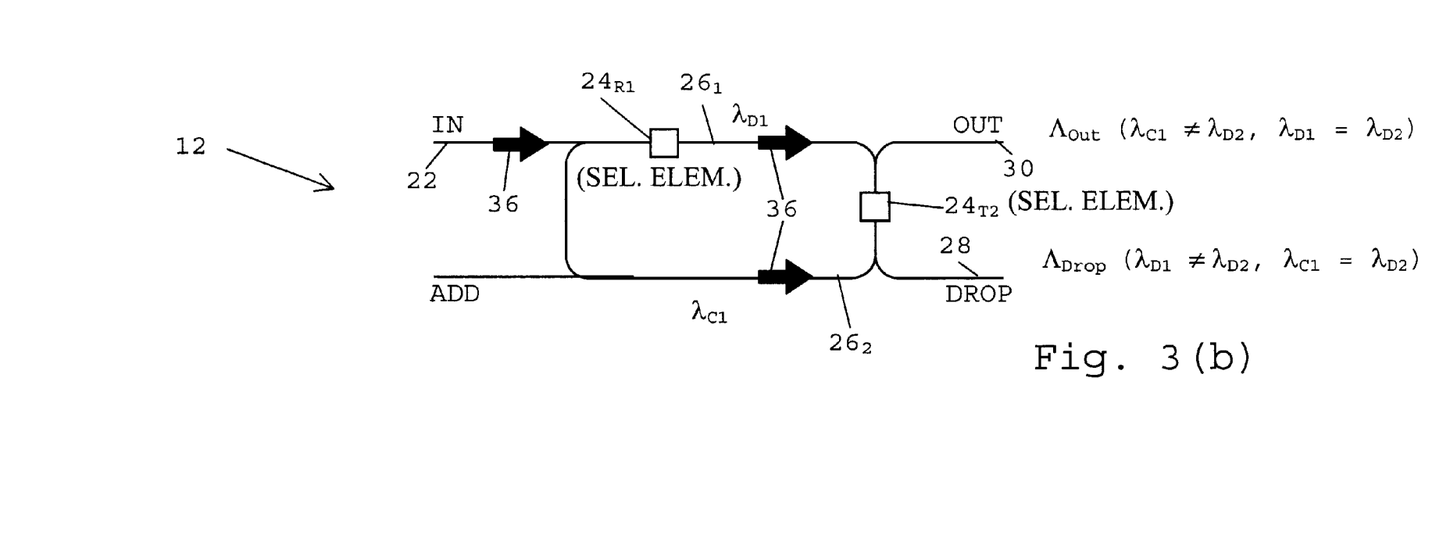
Figure 4:
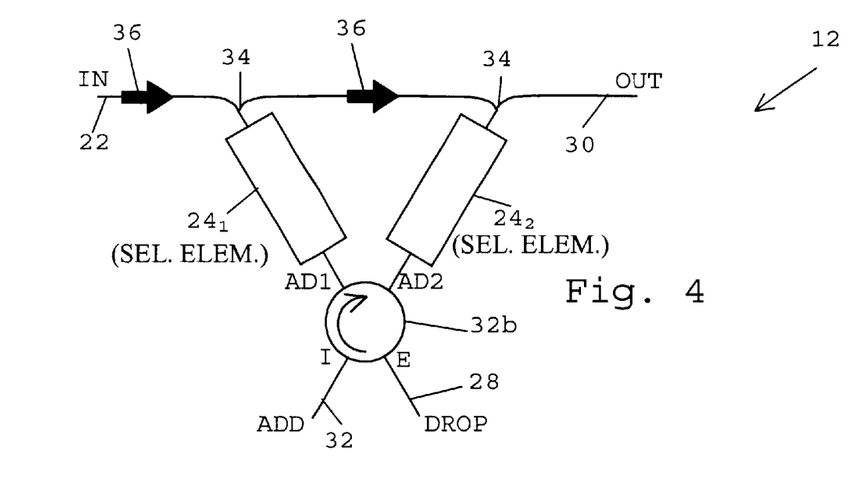
Figure 5:
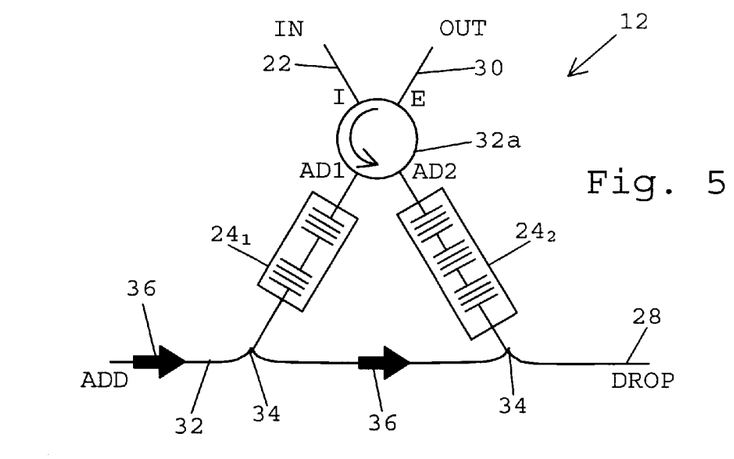

FIGS. 3(a) & (b) shows an analogous embodiment to FIGS. 2(a) & (b), in which couplers 34 in combination with optical isolators 36 has been substituted for the optical circulators 32. FIGS. 4 and 5 show combinations of couplers 34 and isolators 36 with circulators 32. While couplers 34 can be used in the device 12, the couplers can have an excessively high insertion loss. For example, if 3 dB couplers were employed, half of the signal power would be lost with each pass through the coupler. In various embodiments, the optical filter can be included in the coupler, as described in U.S. Pat. No. 5,457,758, to reduce the loss typically associated with couplers.

Figure 6A:
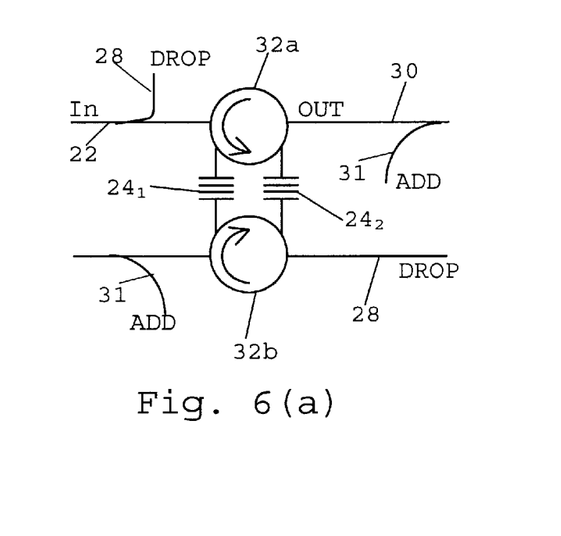

FIG. 6(a) shows a particular embodiment of the configuration shown in FIGS. 2(a) in which Bragg gratings are used as the selective elements $24_1$ and $24_2$. An additional add path 31 can be coupled to the output path 30 as shown to allow for the addition of new and/or reused wavelengths to the output path 30 of the device 12. An additional drop port can also be provided from the input path 22 to provide broadcast access to all of the wavelengths before entering the circulator 32a.

Figure 6B:
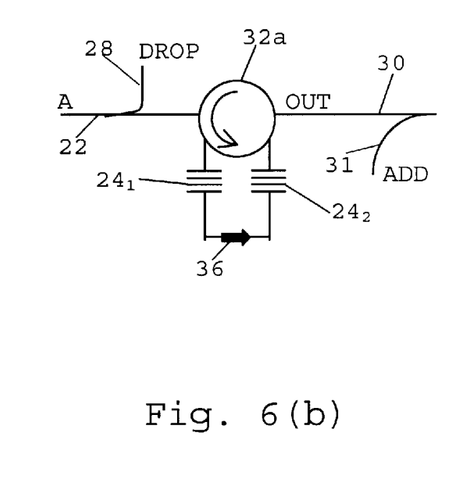

In FIG. 6(b) embodiments, a broadcast and continue drop is provided before the circulator 32a to provide access to all wavelengths. Likewise, the add path 31 is coupled to the output path 30 to allow the addition of new wavelength and the reuse of wavelengths that were filtered using selective elements $24_1$ and $24_2$. In these embodiments, the device 12 serves to filter noise at various wavelengths before a new signal are added to the wavelength via the output port 30. The device 12 can also filter noise or unwanted signal remnants at wavelengths, to which signals are not being added through the device 12. It will be appreciated that unwanted signal remnant and noise filters can be included before, between, and/or after the drop and add paths.

Figure 7:
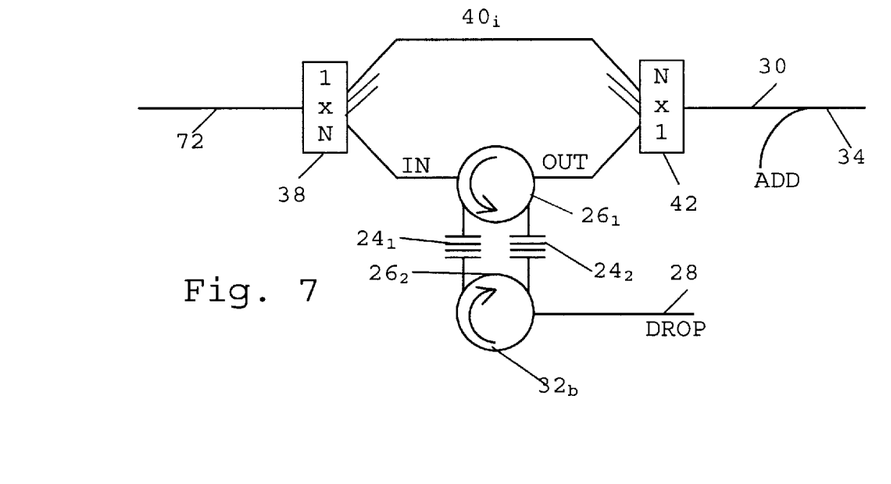

As shown in FIG. 7, the device 12 can include a 1×N optical splitter or switch 38 in which one of the N output ports is optically connected to the input path 22 and the remaining port are optically connected to bypass fibers $40_i$. The output path 30 is optically connected along with the bypass fibers to an N×1 combiner or switch 42 through which the output signal $\Lambda_{OUT}$ travels. As previously discussed, add wavelengths can be inserted into the output path 30 using a coupler 34 or other appropriate device.

The switch configuration of FIG. 7 provides for upgrading, replacing, removing and generally maintaining an in service OAD device without an extended disruption of communications traffic passing through the optical system 10. For example, a new OAD device 12 can be inserted into one of the bypass fibers $40_i$, while traffic is passing through the currently installed OAD device 12. Following installation of the new OAD device, the switches 38 and 42 can be switched such that traffic passes through the newly installed OAD device. Alternatively, traffic could be routed through the bypass fibers $40_i$ to bypass the OAD device until such time as the device is needed. Also, different OAD devices could be optically connected to different ports of the witches 38 and 42, thereby allowing different wavelengths to be dropped depending upon the OAD device selected.

Figure 8:
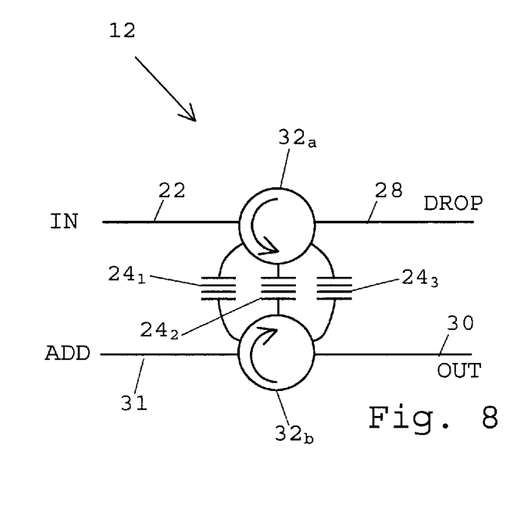

The present invention can be extended by cascading additional selective elements $24_i$ in the OAD device 12. FIG. 8 shows an embodiment in which a third selective element $24_3$ is included in the device 12 and connected to the circulators 32 via third add/drop port AD3.

Figure 9:
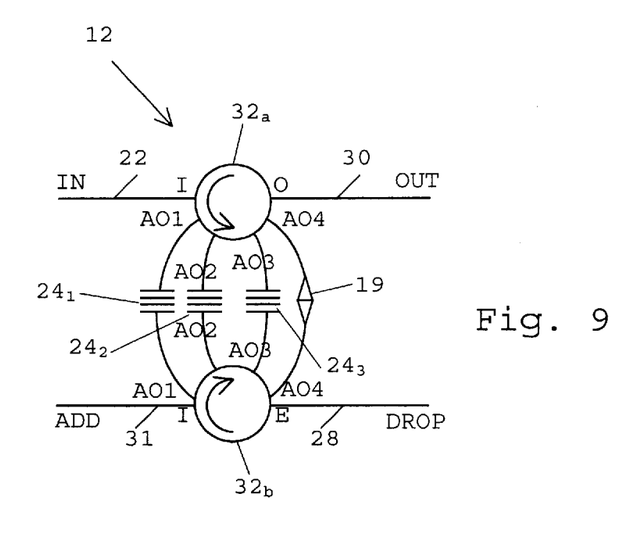

In addition, other components can be included in the OAD device 12 to increase the overall functionality. In FIG. 9 embodiments, amplifiers 19, such as erbium doped amplifier (EDFA), can be added to the device 12 between fourth add/drop ports AD4 of the circulators 32. In this configuration, the amplifier 19 will amplify signals passing to both the output path 30 and the drop path 28 from the input path 22 and the add path 31, thereby eliminating the need for up to four separate amplifiers.

Figure 10:
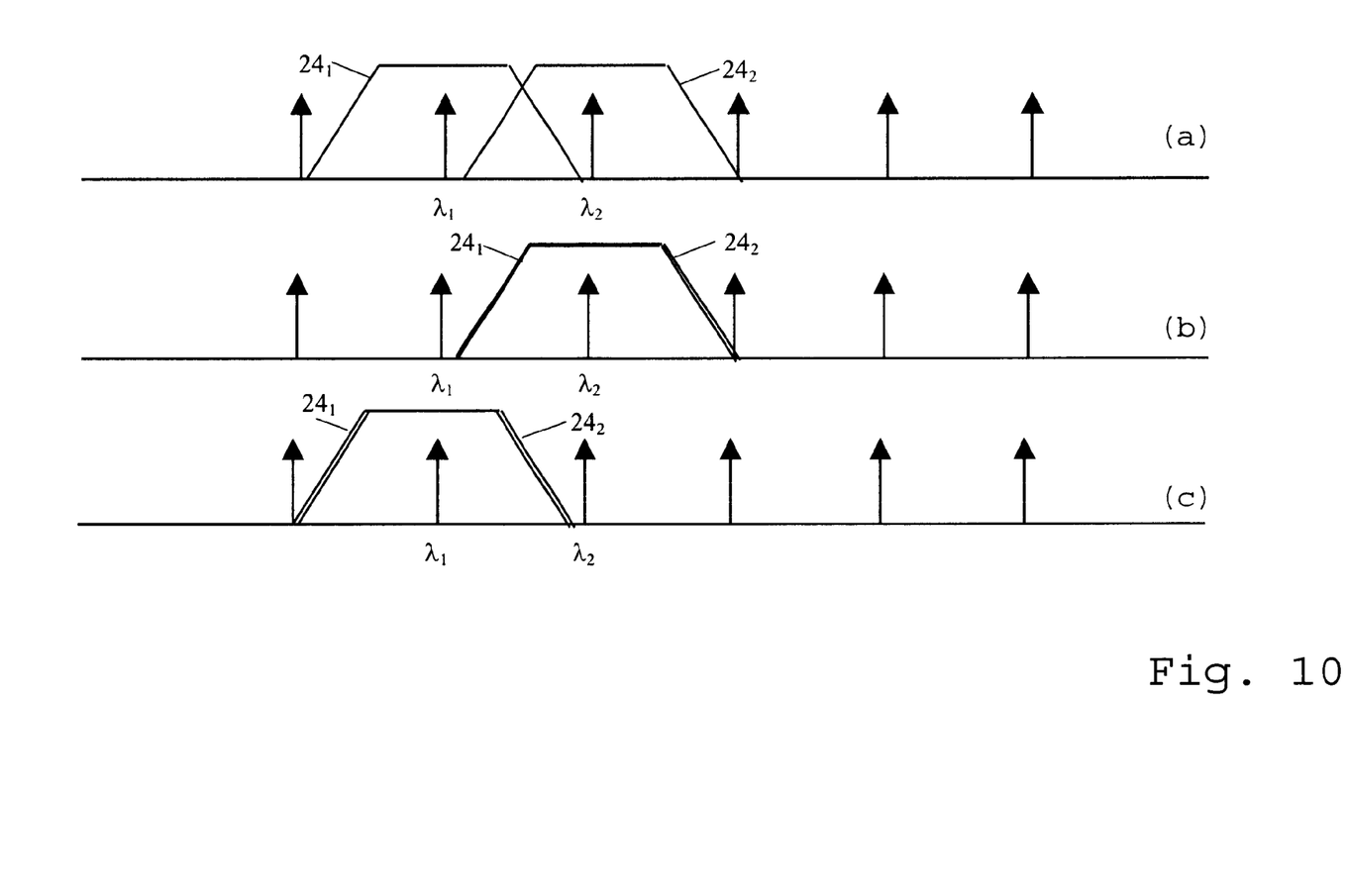
FIGS. 10–11 show exemplary pass or stop band configuration for selective elements.
Figure 11:
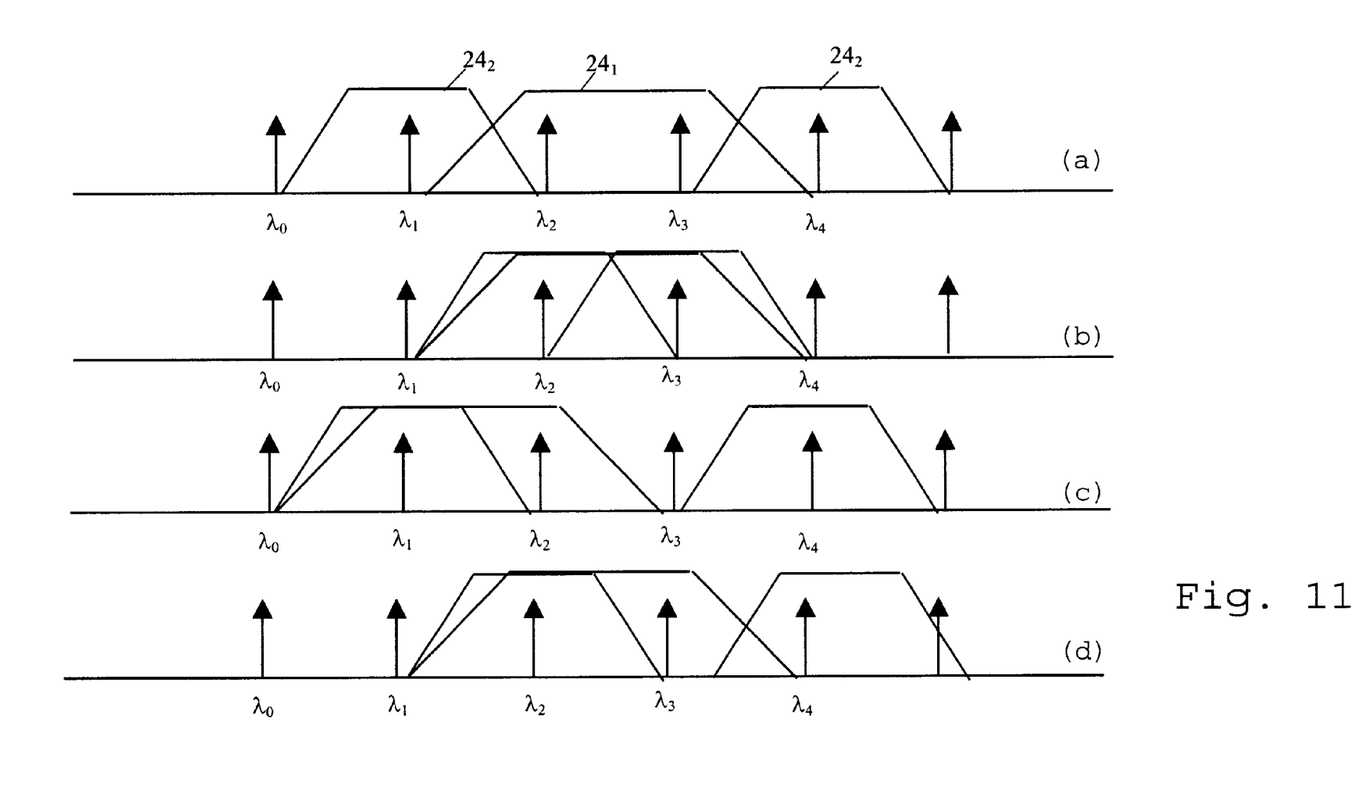

Various configurations of the selective elements 24 used in the OAD device 12 can be provided depending upon the particular system in which the device 12 is deployed. FIGS. 10 and 11 depicts two exemplary configurations of the selective elements 24 in the device 12. In FIG. 10, selective elements $24_1$ and $24_2$ have pass or stop bands corresponding to $\lambda_1$ and $\lambda_2$, respectively. In the configuration shown in FIG. 10a, the OAD device 12 will drop both $\lambda_1$ and $\lambda_2$. As shown in FIGS. 10b&c, tuning either of the selective elements $24_1$ and $24_2$ to the wavelength of the other selective element can turn off the add/drop functionality of the device 12.

The selective elements 24 can also be configured to have pass or stop bands that include one or more wavelengths and the same or different bandwidths. In FIG. 11, for example, the selective elements $24_1$ and $24_2$ include a plurality of filters having different bandwidths, which can be tuned to provide various combinations of add and drop wavelengths. FIGS. 11a&b show tuning configurations for add/dropping all or none of the four wavelengths in the example, respectively. FIGS. 11c&d show two of the other possible combinations.

While the present invention is particularly useful in DWDM systems, it can also be deployed in lightly populated WDM systems. Those of ordinary skill in the art will appreciate that numerous modifications and variations that can be made to specific aspects of the present invention without departing from the scope of the present invention.

What is claimed is:

1. An optical system comprising:
   at least a first optical transmitter configured to transmit information via optical signals including at least one signal wavelength;
   an add/drop device configured to receive the optical signal from said first optical transmitter via an input path, said add/drop device including
      a first selective element configurable to pass a first signal wavelength from said input path to a first add/drop path and pass continuing signal wavelengths differing from the first signal wavelength to a second add/drop path,
      a second selective element configurable to pass a second signal wavelength from said first add/drop path and continuing signal wavelengths differing from the second signal wavelength from said second add/drop path to an output path and pass the second signal wavelength from said second add/drop path and signal wavelengths differing from the second signal wavelength from said first add/drop path to a drop path;
   at least a first optical receiver configured to receive the output signal from said add/drop device; and,
   at least a second optical receiver configured to receive the drop signal from said add/drop device.

2. The system of claim 1, wherein:
   said add/drop device includes an add path configured to provide for add signal wavelengths to pass to said output path; and,
   at least a second optical transmitter configured to transmit information via optical signals including at least one add signal wavelength to said add path.

3. The device of claim 1, further comprising:
   a first optical circulator having at least four ports including an input port optically connected to a first add/drop port, a second add/drop port optically connected by a first add/drop path to said first add/drop port, and to an output port;
   a second optical circulator having at least three ports including a first add/drop port optically connected by a second add/drop path to a second add/drop port that is optically connected to a drop port; wherein
      said first selective element is optically connected between said first add/drop ports on said first and second circulators;
      said second selective element is optically connected between said second add/drop ports on said first and second circulators; and,
      said input path, output path, and drop path are optically connected to said input port, output port, and drop port, respectively.

4. An optical add/drop device comprising:
   a first selective element configurable to pass at least a first signal wavelength from an input path to a first add/drop path and pass continuing signal wavelengths differing from the first signal wavelength to a second add/drop path; and,
   a second selective element configurable to pass at least a second signal wavelength from said first add/drop path and continuing signal wavelengths differing from the second signal wavelength from said second add/drop path to an output path and pass the second signal wavelength from said second add/drop path and signal wavelengths differing from the second signal wavelength from said first add/drop path to a drop path.

5. The device of claim 4, wherein at least one of the first and second selective elements is configurable such that the first signal wavelength becomes equal to the second signal wavelength.

6. The device of claim 4, further comprising an add path optically connected to add signal wavelengths to said output path.

7. The device of claim 4, wherein said add path is optically connected to said first add/drop path via said first selective element.

8. The device of claim 4, wherein said first selective element includes a Bragg grating having a central reflective signal wavelength corresponding to the first signal wavelength.

9. The device of claim 4, wherein said second selective element includes a Bragg grating having a central reflective signal wavelength corresponding to the second signal wavelength.

10. The device of claim 4, wherein said first selective element is one of a plurality of first selective elements configurable to correspond to different signal wavelengths.

11. The device of claim 4, wherein said second selective element is one of a plurality of second selective elements configurable to correspond to different signal wavelengths.

12. The device of claim 4, wherein:
   said first selective element includes at least one first multiple signal wavelength selective element configured to selectively a first set of at least two consecutive signal wavelengths; and,
   said second selective element includes at least one second multiple signal wavelength selective element configured to selectively pass a second set of at least two consecutive signal wavelengths, and said first and second selective elements being configurable to selectively pass the same signal wavelengths.

13. The device of claim 4, wherein at least one of said first and second selective elements is configured to selectively pass a plurality of signal wavelengths.

14. The device of claim 4, wherein said first and second selective elements include Bragg gratings configured to selectively reflect at least the first and second signal wavelengths.

15. The device of claim 4, wherein said first and second selective elements include Fabry-Perot filters configured to selectively transmit at least the first and second signal wavelengths.

16. The device of claim 4, further comprising an input coupler having an input port optically connecting said input path and said first selective element and a first add/drop port optically connecting said first add/drop path and said first selective element.

17. The device of claim 4, further comprising an output coupler having an output port optically connecting said output path and said second selective element and a first add/drop port optically connecting said first add/drop path and said second selective element.

18. The device of claim 4, further comprising:
   a first optical circulator having at least four ports including an input port optically connected to a first add/drop port, a second add/drop port optically connected by a first add/drop path to said first add/drop port, and to an output port;
   a second optical circulator having at least three ports including a first add/drop port optically connected by a second add/drop path to a second add/drop port that is optically connected to a drop port; wherein
      said first selective element is optically connected between said first add/drop ports on said first and second circulators;
      said second selective element is optically connected between said second add/drop ports on said first and second circulators; and,
      said input path, output path, and drop path are optically connected to said input port, output port, and drop port, respectively.

19. A method of dropping a first signal wavelength to a drop path comprising:
   inputting an optical signal including at least one signal wavelength into an input path;
   providing a first selective element configured to pass a first signal wavelength from the input path to a first add/drop path and pass continuing signal wavelengths differing from the first signal wavelength to a second add/drop path; and,
   providing a second selective element configured to pass a second signal wavelength from the first add/drop path and continuing signal wavelengths differing from the second signal wavelength from said second add/drop path to an output path and pass the second signal wavelength from the second ad/drop path and signal wavelengths differing from the second signal wavelength including the first signal wavelength from the first add/drop path to a drop path.

20. A method of preventing a first signal wavelength from being dropped to drop path according to the method of claim 19 comprising:
   adjusting the second selective element to pass the first signal wavelength from the first add/drop path and continuing signal wavelengths differing from the first signal wavelength from said second add/drop path to the output path and pass the first signal wavelength from the second add/drop path and signal wavelengths differing from the first signal wavelength from the first add/drop path to a drop path.

* * * * *